Aug. 18, 1959 P. L. CASEY 2,900,011
MULTI-USE CHAIR
Filed Dec. 14, 1954 3 Sheets-Sheet 1
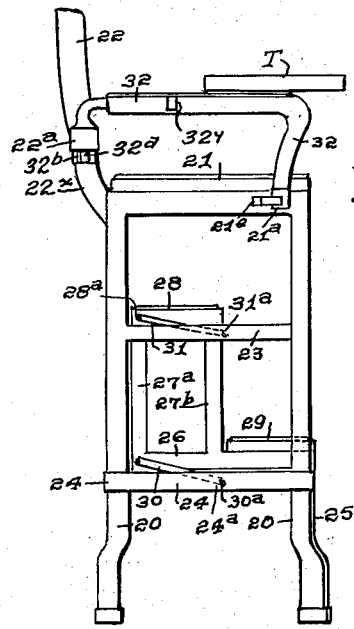
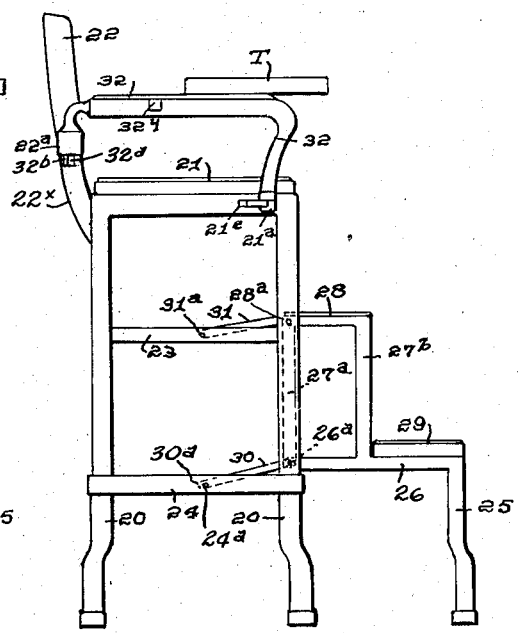
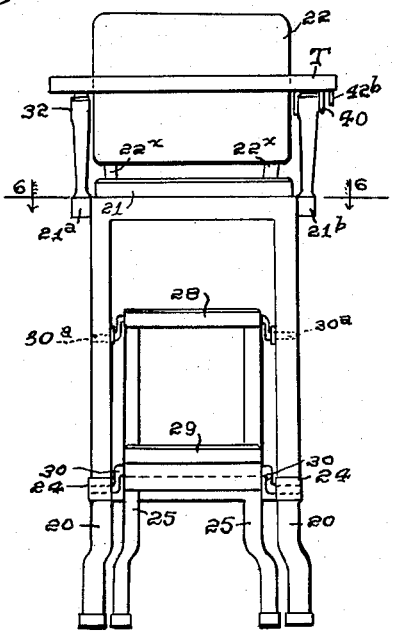
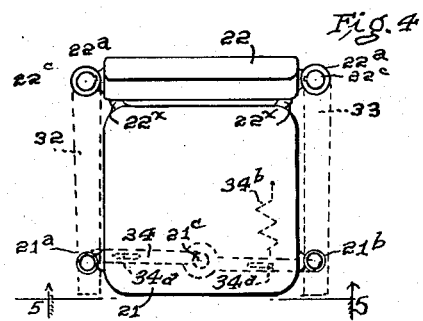
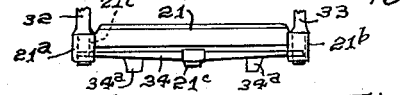
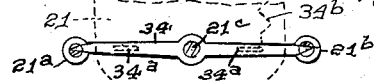
INVENTOR.
Patricia L. Casey
BY Walter W. Burns
Attorney Aug. 18, 1959     P. L. CASEY     2,900,011
MULTI-USE CHAIR
Filed Dec. 14, 1954     3 Sheets-Sheet 2
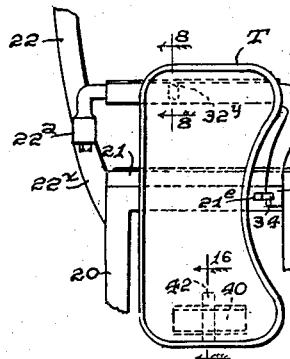
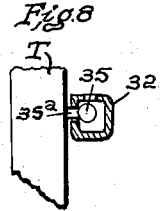
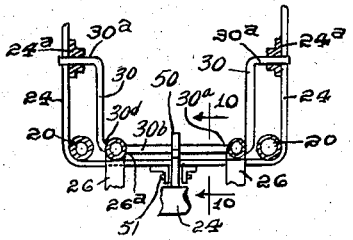
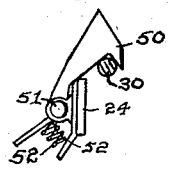
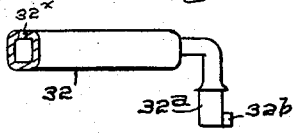
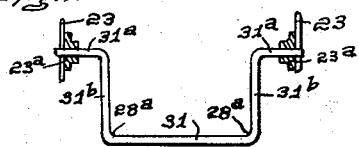
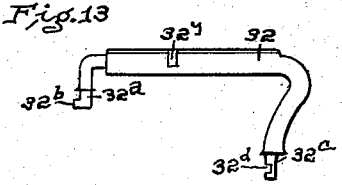
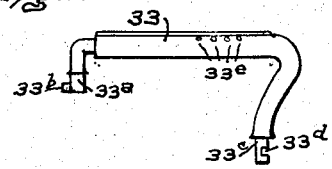
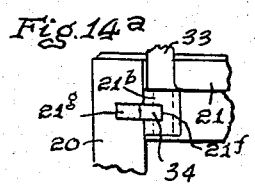
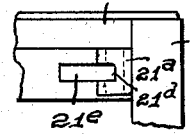
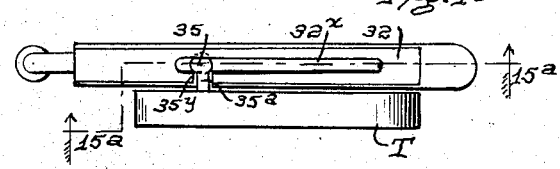
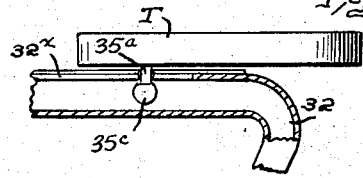
INVENTOR.
Patricia L. Casey
BY Walter W. Burns
Attorney Aug. 18, 1959 P. L. CASEY 2,900,011
MULTI-USE CHAIR
Filed Dec. 14, 1954 3 Sheets-Sheet 3
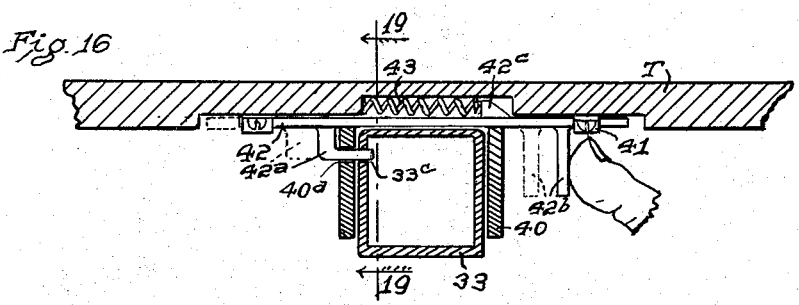
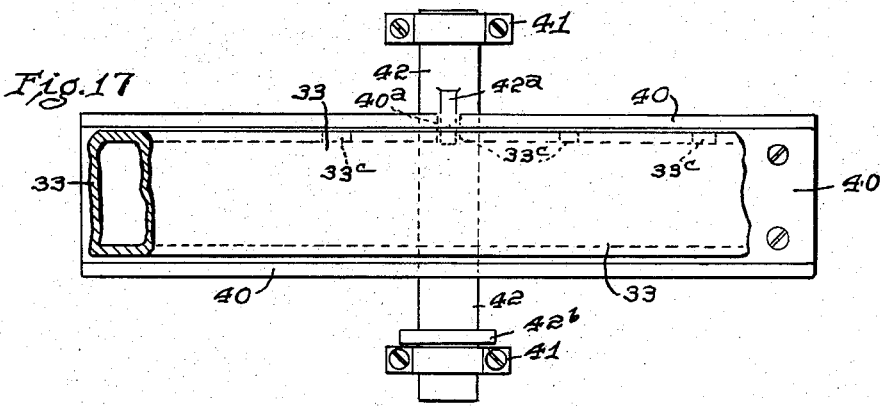
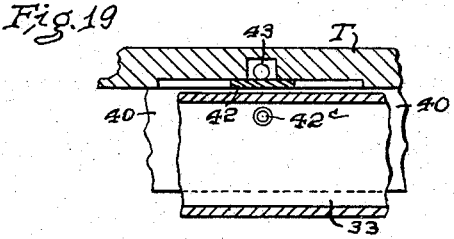
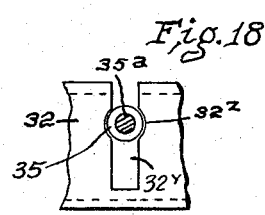
INVENTOR.
*Patricia L. Casey*
BY *Walter W. Burns*
*Attorney*

United States Patent Office
2,900,011
Patented Aug. 18, 1959

2,900,011

MULTI-USE CHAIR

Patricia L. Casey, Munich, Germany

Application December 14, 1954, Serial No. 475,023

3 Claims. (Cl. 155—127)

This invention relates broadly to chairs and particularly to chairs having multiple uses.

In the modern homes, there is a tendency to have kitchen-dining room areas rather than to have separate rooms for the dining room and kitchen function. In the design and use of these kitchen-dining room areas, great care is exercised to utilize all of the space which is available. In doing this, both wall and floor space for the necessary storage and use of equipment are considered. One of the ways in which floor space is conserved is in the economical use of space for chairs.

The primary object of this invention is the provision of an improved chair for multiple uses.

Another object of the invention is the provision of an improved multiple-use chair which may be used as an utility chair for general kitchen use and as a step ladder in the kitchen and also as a high chair for a child.

A further object of the invention is the provision of an improved multiple-use chair having a detachable arm construction whereby the arm may be readily detached to make it readily transferable from one use to another.

Still another object of the invention is the provision of an improved multiple-use chair having a completely removable adjustable child's tray.

Another and further object of the invention is the provision of an improved multiple-use chair having a completely removable adjustable child's tray with a single securing means for holding the tray in place with relation to the arms.

Another and still further object of the invention is the provision of an improved chair having a folding step to provide for a foot-rest for a child when the chair is used for a high chair and detachable arms and a folding tray for providing for its use as a high chair for a child.

Other and further objects of the invention will be apparent to those skilled in the art from a reading of the complete specification.

Referring to the drawing wherein I have illustrated a preferred embodiment of my invention, Fig. 1 is a side view of my invention applied to a kitchen utility chair which, at present, is popular with users.

Fig. 2 is a side view of Fig. 1 but with the steps moved to the forward position.

Fig. 3 is a front view of the construction shown in Figs. 1 and 2.

Fig. 4 is a top plan view of the utility chair shown in Figs. 1, 2, and 3, with the arms of my invention and the arm-locking device indicated in dotted lines.

Fig. 5 is a detail sectional view of the locking construction shown in dotted lines in Fig. 4, the view being taken from the line 5—5 of Fig. 4.

Fig. 6 is a detail sectional view taken on the line 6—6 of Fig. 3.

Fig. 7 is a detail side elevation of the top of the utility chair showing the child's tray hanging at the side of the chair on the outside of the arm.

Fig. 8 is a detail cross sectional view of the fastening means connecting the tray to the chair-arm taken on the line 8—8 of Fig. 7.

Fig. 9 is a detail plan view of the means for locking the body of the utility chair and steps in rigid relative positions when my invention is applied to the chair.

Fig. 10 is a detail sectional view taken on the line 10—10 of Fig. 9.

Fig. 11 is a side view of the rear end of one arm showing the projecting end of the bayonet joint for securing the arm to the chair-back.

Fig. 11a is a perspective view of the fitting at the side of the chair-back which receives the projecting end of the bayonet joint shown in Fig. 11.

Fig. 12 is a detached plan view of the swinging crank member 31 which is identical with the swinging crank member 30, the two acting to hold the main frame and step frame in guided spaced relation.

Fig. 13 is an elevational view of the right side of the right arm.

Fig. 13a is a detail view of the lug 21a which coacts with the turned-down end of the right arm.

Fig. 14 is an elevational view of the right side of the left arm 33.

Fig. 14a is a detail view of the lug 21b which coacts with the turned-down end of the left arm 33.

Fig. 15 is a top plan view of the right arm, the tray being shown in lowered position.

Fig. 15a is a detail sectional view on the line 15a—15a of Fig. 15 but with the tray in operative position.

Fig. 16 is a sectional detail view of the fastening means for the tray to the left arm, taken generally on the line 16—16 of Fig. 7 of the tray.

Fig. 17 is a detail underneath view of the fastening means of Fig. 16 showing also a section of the left arm 33.

Fig. 18 is a modified slot showing a cut-away portion to permit the complete removal of the tray from its arm.

Fig. 19 is a detail sectional view on the line 19—19 of Fig. 16.

Similar reference characters refer to the same or similar parts throughout the specification and drawing.

In the disclosure of my invention, I have illustrated it in connection with a popular utility chair which may be put to use as a low step ladder or it may be used as a medium high chair.

In the modern home much effort has been given to the reduction of equipment due to the necessity for the utilization of all space in the home. The adaptation of my invention as illustrated, is applied to a utility chair which renders it of multiple use.

Referring particularly to Figs. 1 to 7, there is illustrated a chair having four substantially similar legs 20 which support a seat 21. A chair back 22 is provided, and is supported by frame members 22x.

Connecting each two legs at the sides of the chair, are stiffening members 23, as well shown in Figs. 1 and 2.

Around the chair and connected to all four legs is a frame member 24. The chair has a two-step supporting frame comprising two front legs 25 which support the frame at the front when the steps are being used. Rearwardly extending members 26 are connected to the tops of the legs 25. The length of the legs 25 is such that the rearwardly extending members 26 will be substantially level and the rears of the rearwardly extending members 26 will rest upon the frame member 24 when the frame members 26 are in their forward positions.

Extending upwardly from the rearwardly extending frame members 26 are spaced upright members 27a, 27b which at their upper ends are secured the step member.

Secured to the forward portions of the frame members 26 is a lower step member 29, the front edge of which is just above the forward legs 25. It will thus be seen that the step 29 when in forward position may readily be used as a first step and the step member 28 as the second step of a short step-ladder. The seat 21 being above and to the rear of the step 28, may be used as a third step when in use as a step ladder.

In the embodiment illustrated, the rearwardly extending frame members 26 are secured to the chair by a swinging crank member 30 whose trunnions 30$^a$ extend outwardly and are pivoted in the frame member 24 at 24$^a$ as clearly shown in Figs. 1 and 2. The swinging loop portion 30$^b$ of the swinging crank member 30 is pivoted at 30$^c$ and 30$^d$, as shown in Fig. 9, in the rear ends of the rearwardly extending frame members 26 as at 26$^a$.

A similarly shaped swinging crank member 31, having trunnion ends 31$^a$, is pivoted at 23$^a$ in the members 23 which pivot points are located above the pivot points 24$^a$ of the frame. See Fig. 12. The swinging crank portion 31$^b$ is pivoted in the rear portions of the tread 28 at 28$^a$, as shown in Figs. 1 and 2.

The structure of the foregoing description is all old in the art, per se, and is not a part of my invention.

I will now set forth the description of my invention as applied to the structure already described. The structure described above has utility as a step-ladder as already indicated and also as a kitchen stool. And with my invention, it retains all of its inherent advantages and in addition is available for use as a high chair for a child, either sitting at a table of ordinary height or separate from the table with the tray T in position for use.

Attached to the seat back 22 at opposite sides are lugs 22$^a$ which have substantially vertical holes 22$^c$ from top to bottom for reception of a portion of a respective arm portion for holding the arms rigidly in place. At the inner side of this vertical hole is a slot 22$^b$ which with the hole 22$^c$ provides one member of a bayonet type joint. This may be clearly seen in Fig. 11$^a$, its coacting portion being shown in Fig. 11. In Fig. 11 is shown the rear extension of an arm 32 which is the arm for the right side of the chair. The turned-down cylindrical end 32$^a$ of the arm 32 has a lug 32$^b$ at its bottom in a position so that it will pass through the lug 22$^a$ along the slot 22$^b$ at the side of the hole 22$^c$. The hole 22$^c$ has an axis which is slightly farther to the rear at its top then at its bottom and the lug 32$^b$ is so placed that when the arm is in place, the lug 32$^b$ will bear on the under side of the lug 22$^a$ in a manner to hold all parts tight and under tension when the arm is in place for use. This will be made clear from later description.

At the turned-down forward end of the arm 32 is a second fastening means to secure the forward end of the arm. Secured to each forward portion of each side of the seat of the chair is a lug 21$^a$ at the right side and 21$^b$ at the left side.

The lug 21$^a$ has a cylindrical hole 21$^c$ from top to bottom. This hole is in position and of a size to receive the lower extremity 32$^c$ of the turned-down end of the arm 32. At the rear of the extremity 32$^c$ is a slot 32$^d$ cut halfway across its body which is cylindrical in shape. This slot 32$^d$ registers with a similarly placed slot 21$^d$ in the lug 21$^a$ and coacts with the arm-locking lever 34 as will be later described.

The left arm 33 has a cylindrical portion 33$^a$ which in turn has a lug 33$^b$ similar, respectively to the cylindrical portion 32$^a$ and its lug 32$^b$ of the arm 32 already described, to fit the hole in the lug 22$^a$ at the left side of the chair-back 22, already described.

At the turned-down front end of the arm 33 is a cylindrical end 33$^c$ corresponding to the cylindrical end 32$^c$ of the right arm 32. The cylindrical end 33$^c$ is provided with a slot 33$^d$ but it is to be especially noted that this slot 33$^d$ is on the front of the cylindrical portion 33$^c$ while the slot 32$^d$ of the right arm 32 is at the rear. This arrangement is to take care of the necessary cooperation of the ends of the locking lever 34 now to be described.

Secured to the underside of the seat 21 is a pivot member 21$^c$ upon which is pivoted the locking lever 34. This locking lever 34 has arms of equal length extending at its sides from the pivot 21$^c$. The pivot 21$^c$ is so placed that the ends of the lever 34 will move freely in the slot 21$^e$ which is provided in the side frame of the seat 21 as shown in Figs. 1 and 2. The slot 21$^e$ is opposite the slot 21$^d$ in the lug 21$^a$ and the slot 32$^d$, so that when the corresponding end of the lever 34 is in locking position, it will move in the slots 21$^e$ and 21$^d$ and enter the slot 32$^d$ to hold the arm 32 in rigid relation to the chair as a whole.

As shown in Fig. 14, the turned-down end of the arm 33 is provided with the cylindrical portion 33$^c$ which has the slot 33$^d$ in its forward side for coaction with the slots 21$^f$ in the lug 21$^b$ and 21$^g$ in the left front leg member 20 of the seat 21, as shown in Fig. 14$^a$, all coacting with the opposite end of the lever 34 to permit its end to enter the slot 33$^d$ to lock the arm 33 rigidly in place relative to the chair as a whole. On the under side of the lever 34 are two spaced finger-operated lugs 34$^a$ which are adjacent the ends for use of the operator in releasing the lever 34 from the lower ends of the turned-down ends of the arms 32 and 33 by removing the lever-ends from the slots 32$^d$ and 33$^d$. A spring 34$^b$ with one end secured to the bottom of the seat 21 and the other to the lever 34, as shown in Fig. 6, normally tends to hold the lever 34 in its locking position. In assembling the arms 32 and 33 on the chair, one arm is united with its coacting part of the bayonet joint, then swung to position and the turned-down end placed in the opening in the lug 21$^a$ or 21$^b$, as the case may be. With one hand on a lever lug 34$^a$, the lever 34 is released so the arm may be moved to place. The arm is then forced nearly to place. The other arm is then put in place and both arms forced down together. The spring 34$^b$ will then force the lever 34 to its holding or locking position.

The arms are preferably made of tubular stock. In the top of one arm, as the arm 32, there is an elongated slot 32$^x$ which is of sufficient length to give the tray T all the movement which it may need, see Figs. 15 and 15$^a$. At or near the rear end, preferably, this slot opens at the side of the arm as at 32$^y$ as shown in Figs. 1, 2 and 13. The tray T on its bottom, in position to engage the lot 32$^x$, has a ball 35 with a shank 35$^a$, the latter sliding along in the slot with the head 35 below the slot 32$^x$. When it is desired to have the tray out of the way, it is moved to the rear until the shank 35$^a$ of the ball 35 engages the side slot 32$^y$. The tray may then be swung over the right side of the right arm with the shank 35$^a$ in the slot 32$^y$. The tray will then hang in a vertical position and will be out of the way.

I have described how one side of the tray is adjusted along the arm 32. I will now describe the means for adjustably securing the opposite side of the tray to the other arm in any one of a plurality of adjustments and the means for holding both sides to a bodily movement forward or rearward and for securely holding the whole tray in place when the securing means are applied.

Referring particularly to Figs. 16 and 17, the tray T is provided with a forwardly and rearwardly extending guide 40 of U-shape cross section which is suitably secured to the underside of the tray as by screws if the tray is of wood. This guide 40 is in a position and of a shape to bear on the top and contact the sides of the arm 33 with a slidable fit. On the under side of the tray T are strap guides 41 in which is slidably mounted a locking slide 42 which has a locking portion 42$^a$. This locking portion 42$^a$ is placed to freely pass through an opening 40$^a$ in the guide 40 and performs a locking function with any one of a series of openings 33$^e$ in the arm 33. Integral with the sliding lock 42 is a thumb-piece 42$^b$ which is used to push the locking slide 42 to the left in Fig. 16 when it is desired to unlock the tray.

With the locking slide pushed to the left as shown in Fig. 16, the locking portion 42$^a$ is disengaged from the opening 33$^c$ and the tray may be then moved from front to rear or rear to front to adjust the tray T to fit the body of the child. It is to be noted that during this adjustment, the flanges of the channel guide 40 holds the tray T to front and rear bodily movement and the ball 35 in its slot 32$^x$ holds the other side of the tray on the arm 32. In order to bring the sliding lock 42 back to its normal position, I provide a spring member 43 having one end coacting with the end of a depression in the tray T and the other coacting with a lug 42$^c$ on the sliding lock 42. On release by the thumb of the operator, the sliding lock 42 will be moved by the spring 43 to the right in Fig. 16 and the locking portion 42$^a$ will engage the first opening 33$^e$ with which it comes in contact. The tray is then locked in position.

With all parts in position as heretofore set forth, the adjustment of the tray may be made as has just been described. If the tray is to be removed from its place either to place a child in the chair or because it is not then needed, the thumb-piece 42$^b$ may be pushed in and the tray T raised and swung over the right side of the chair arm 32 with the shank 35$^a$ of the ball 35 in registry with the side slot 32$^y$.

With the parts in these settings, if it is desired to remove the arms, either one of the thumb-pieces 34$^a$ of the locking lever 34 is moved to release the forward turned-down ends of the arms 32, 33. The arm 32 and the tray T may be removed as a unit and the arm 33 removed by itself. To remove the arms after they have been released at their forward ends, it is necessary only to swing the arms outwardly until the lug 32$^b$ or 33$^b$ registers with the slot at the side of its lug-opening in the lug 22 and the arm may be lifted vertically and clear of the chair. It is to be noted that either arm may be put on or taken off without regard to the other arm.

To secure the forwardly moving frame 25, 26 to the main frame and provide a rigid relation of all parts, the locking catch or dog 50 is pivoted to the rearward edge of the frame member 24 on the pivot 51 in position to engage the cross or connecting portion of the swinging crank member 30. This locking catch or dog 50 will then hold the whole structure rigid and make it more difficult for a child to upset the chair. When the arms and tray have been removed as above described, the chair may be used as a utility chair. To release the catch or dog 50, it is moved toward the front of the chair, a spring 51 tends to swing the catch rearwardly.

In Fig. 18 is illustrated a modification showing cut-away portions 32$^z$ at the sides of the slot 32$^y$ which, with the slot 32$^y$, form an opening which will permit the removal of the ball 35. In this manner, the chair and arms may be used without using the tray T.

It is to be noted that the arms may be swung to the rear while still supported only by the lugs 22$^a$ and the chair used with the arms in this position.

While I have illustrated and described my invention in detail, it is to be understood that it may be used in connection with other utility chairs than the one illustrated and that modifications and changes may be made without departing from the spirit of the invention and within its scope as claimed.

Having described my invention, what I claim is:

1. A multiple-use chair for children comprising legs, a seat and seat-supporting frame, provided with lugs at its outer forward side portions, at the upper ends of the legs, a chair back supported at the rear of the seat, one part of a bayonet-type joint rigid with relation to each side of the back, arms, each arm having a part complementary to the part of the bayonet-type joint at the respective side of the seat and securable thereto, the lower forward portions of the arms and the lugs on the forward portions of the seat-supporting frame, having complementary and coacting parts for securing the lower forward ends of the arms in place with relation to the seat, and lever means beneath the seat having locking portions for engaging said parts locking the lower forward ends of the arms to the respective lugs and for, at will, releasing the arms for their removal from the chair.

2. A construction described in claim 1 and having the locking portions engageable, at will, to lock either or both arms in place.

3. A construction as set forth in claim 1, and having its bayonet-type joint part at the side of the seat in position to release the arms when the arms are swung wide of the position of the seat.

References Cited in the file of this patent

UNITED STATES PATENTS

| | | |
|---|---|---|
| 144,288 | Rand | Nov. 4, 1873 |
| 325,178 | Knowlton | Aug. 25, 1885 |
| 497,096 | Harrison | May 9, 1893 |
| 1,120,215 | Meyer | Dec. 8, 1914 |
| 1,681,879 | Putnam | Aug. 21, 1928 |
| 1,803,947 | Runkles et al. | May 5, 1931 |
| 2,285,845 | Stinson | June 9, 1942 |
| 2,450,301 | Quiggle | Sept. 28, 1948 |
| 2,468,683 | Michal | Apr. 26, 1949 |
| 2,543,239 | Gross | Feb. 27, 1951 |
| 2,562,629 | Miles | July 31, 1951 |
| 2,619,152 | Lane | Nov. 25, 1952 |
| 2,633,182 | Lehman et al. | Mar. 31, 1953 |
| 2,633,899 | Armstrong | Apr. 7, 1953 |
| 2,669,285 | Young | Feb. 16, 1954 |
| 2,704,116 | Scanlon | Mar. 15, 1955 |
| 2,707,020 | Nobbe | Apr. 26, 1955 |
| 2,718,917 | Johnson | Sept. 27, 1955 |